United States Patent [19]

Hwo

[11] Patent Number: 4,960,820
[45] Date of Patent: Oct. 2, 1990

[54] COMPOSITIONS AND ARTICLES USING HIGH MELT FLOW POLY-1-BUTENE AND POLYPROPYLENE BLENDS

[75] Inventor: Charles C. Hwo, Sugar Land, Tex.

[73] Assignee: Shell Oil Company, Houston, Tex.

[21] Appl. No.: 316,258

[22] Filed: Feb. 27, 1989

Related U.S. Application Data

[63] Continuation-in-part of Ser. No. 198,548, May 24, 1988, abandoned.

[51] Int. Cl.$^5$ .................. C08L 23/20; C08L 23/12; C08K 3/00; C08K 5/00
[52] U.S. Cl. ................................ 524/528; 525/240; 524/491
[58] Field of Search .................... 525/240; 524/528

[56] References Cited

U.S. PATENT DOCUMENTS

| | | | |
|---|---|---|---|
| 3,356,765 | 12/1967 | Musso et al. | 260/897 |
| 3,455,871 | 7/1969 | Coover et al. | 260/41 |
| 3,808,304 | 4/1974 | Schirmer | 264/289 |
| 4,039,507 | 8/1977 | Paige et al. | 260/42.46 |
| 4,075,290 | 2/1978 | Denzel et al. | 260/897 |
| 4,354,004 | 10/1982 | Hughes et al. | 525/240 |
| 4,455,273 | 6/1984 | Harpell et al. | 264/184 |
| 4,677,025 | 6/1987 | Davison et al. | 428/349 |
| 4,727,112 | 2/1988 | Kohyama et al. | 525/193 |
| 4,727,113 | 2/1988 | Kohyama et al. | 525/193 |

FOREIGN PATENT DOCUMENTS 1570353  4/1971  Fed. Rep. of Germany .

OTHER PUBLICATIONS

Poly(1-Butene)- Its Preparation and Properties, by I.D. Rubin, Publ. by Gordon and Breach, New York, 1968, p. 71.
Polymers Handbook, Publ. by Bandrup and Immergut, New York, 1975, Sec. IV-7.
Technical Bulletin SC:391-79, Shell Chemical Company, "Processing Shell Polybutylene Film Grade Resins," Published May 1979.

Primary Examiner—Carman J. Seccuro

[57] ABSTRACT

A composition comprising a blend of no more than about 10% by weight of a low molecular weight, isotactic poly-1-butene polymer with a melt index in the range of greater than 100 to about 1000, and at least about 90% by weight of a propylene polymer, including articles and fibers prepared therefrom.

35 Claims, No Drawings

COMPOSITIONS AND ARTICLES USING HIGH MELT FLOW POLY-1-BUTENE AND POLYPROPYLENE BLENDS

This is a continuation-in-part of U.S. Ser. No. 198,548, filed May 24, 1988, now abandoned.

FIELD OF THE INVENTION

The present invention relates to a composition comprising a blend of high melt flow isotactic poly-1-butene polymer with a melt index in the range of greater than 100 to 1000 with at least 90% by weight of a propylene polymer. The composition is suitable for use as a film or sheet. The film or sheet can be shrinkable or non-shrinkable. The novel film or sheet can be biaxially or monoaxially oriented. The composition can be processed into a tape. Alternatively, the present invention relates to an injection molded blown bottle or an SPPF (solid phase pressure formed) container.

BACKGROUND OF THE INVENTION

Films of thermoplastic polymer compositions have found many commercial uses, particularly in packaging. One use of such films is in the production of shrink films and films for wrapping foods.

Blown films are popular in the commercial arena. Methods for producing blown film from commercial film grade polybutylene resins are described in Technical Bulletin SC:397-79 of Shell Chemical Company, "Processing Shell Polybutylene Film Grade Resins," published May 1979.

The present invention relates to compositions which can be formed into films or sheets that have improved processing properties and good optics. The novel sheets can be biaxially oriented to result in films with good optics. The present invention aids in reducing the number of scraps which result from making films with a biaxially stretched system. The present invention also relates to blown articles with high gloss and clarity container when compared with more conventional low melt index butene-1 polymer blends.

Finally, the present invention relates to fibers which have improved stretchability, and are capable of being spun because it is believed that the high melt index butene-1 polymers act as a lubricant or plasticizer for the essentially propylene fibers.

U.S. Pat. No. 3,808,304 issued to Schirmer discloses heat sealable blends of butene-1 homopolymer with polypropylene. Schirmer does not discuss using melt index butene-1 polymers prepared by peroxide cracking as in the present invention. In addition, Schirmer discloses that preferred blend use polypropylene at levels of 20-80% by weight.

U.S. Pat. No. 4,075,290 issued to Denzel discloses heat sealable blends of 80-99% by weight of polybutylene and 1-20% by weight of polypropylene. The disclosure is limited to specified ranges of each polymer component.

U.S. Pat. No. 4,354,004 issued to Hughes claims a heat sealable blend prepared from butene-1-ethylene copolymers, about 2-9% by weight of polypropylene and from about 0.02% to 1.5% by weight of high density polyethylene.

U.S. Pat. No. 3,455,871 issued to Coover, assigned to Eastman Kodak Co. describes substantially crystalline homopolymer and copolymers of 1-butene as a concentrate carrier for non-olefinic additives. The Coover patent does not claim or describe the same kind of material as used in the present invention. Coover claims a butene-1 material with an intrinsic viscosity in the range of 0.2 to 5.0. The present invention has properties different from the Coover material.

SUMMARY OF THE INVENTION

The present invention relates to a composition comprising a blend of (i) no more than about 10% by weight of low molecular weight, isotactic poly-1-butene polymer with a melt index in the range of greater than 100 to about 1000, and (ii) at least about 90% by weight of a propylene polymer.

The novel composition can further comprise about 0.1 to about 1% by weight of an additive The additive can be a mold release agent, U.V. stabilizer, thermal stabilizer, filler, slip agent, antiblock agent, nucleating agent, pigment, antioxidant, flame retardant or combination thereof.

The preferred poly-1-butene polymer for use in the invention has a melt index in the range of about 150 to about 225.

The poly-1-butene polymer for use in the invention has an intrinsic viscosity of about 0.11 to about 0.06 as determined at 130° C. using known intrinsic viscosity formulas such as those in *Poly(1-Butene)-its Preparation and Properties,* by I. D. Rubin, published by Gordon and Breach, New York, 1968, page 71; see also *Polymers Handbook* published by Brandrup and Immergut, New York, 1975, Sec. IV-7 (formulas incorporated by reference).

Usable poly-1-butene polymers for the novel formulations can be butene-1 homopolymers, or butene-1 copolymers having 1-30 mole % of another alpha olefin having from 2-8 carbon atoms as comonomer.

The propylene polymer usable herein can be a propylene homopolymer, or a propylene copolymer having 1-30 mole % of another alpha olefin having from 2-8 carbon atoms as comonomer.

The most preferred composition of the invention involves 95% by weight of a propylene polymer and 5% by weight of a poly-1-butene polymer.

The present invention relates to sheets or films formed from the novel blend. Further, the present invention relates to molded articles prepared using the novel blends. The molded articles may be thermally molded, injection molded, or molded by any conventional method.

The present invention relates to blow molded articles prepared using the novel blend and conventional blow molding techniques.

Additionally, the present invention relates to fibers prepared, such as by the spin draw method, using the novel blend.

DETAILED DESCRIPTION OF THE INVENTION

The isotactic poly-1-butene referred to herein -is a butene-1 polymer containing at least about 95%, preferably at least about 97%, and more preferably about 98%, by weight of isotactic portions. Useful in the present invention are isotactic poly-1-butenes having a low molecular weight, such as about 150,000 or less, as determined by solution viscosity in "Decalin" (decahydronophthalene). Usable poly-1-butenes have a density of 0.914-0.919, preferably 0.916-0.919 and especially 0.917-0.919. Usable poly-1-butenes have melt indices in the range of greater than 100 to 1000, more preferably 150–225, (molecular weight at 150 melt index is 113,000, at 225 melt index, molecular weight is 106,000) and most preferably 175–225, as determined by ASTM D-1238 Condition E, at 190° C.

The butene-1 polymers (PB) usable herein are either butene-1 homopolymers or copolymers. If butene-1 copolymers are used, the non-butene comonomer content is preferably 1–30 mole of either ethylene, propylene, or an alpha olefin having from 5 to 8 carbon atoms.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3.AlCl_3$ and $Al(C_2H_5)_2Cl$ at temperatures of 10–50° C., preferably 20–40° C., e.g. according to the process of German Published application No. 1,570,353. High melt indices are then obtained by further processing the polymer by peroxide cracking.

Poly-1-butene PB0800 a developmental polymer produced by Shell Chemical Company, of Houston, Texas is a particularly suitable polymer for use in the novel formulation. This novel polymer is a homopolymer with a melt index of 200 and a molecular weight of 108,000.

The propylene polymers usable herein can be either propylene homopolymers or copolymers. If propylene copolymers are used, they can be random or block copolymers with the comonomer content preferably 1–30 mole % of either ethylene, butene, or an alpha olefin having from 5 to 8 carbon atoms.

Propylene polymer useful in the invention preferably has a melt index of less than 60, more preferably from about 1–15, as measured by ASTM D-1238, Condition L at 230° C. A particularly suitable propylene, has a melt flow of 2.8 and is available from Shell Chemical Company, of Houston Texas as PP5C08. Random copolymers of polypropylene having a 3.5 wt % $C_2$ content are contemplated as a usable polymer for the blend when the end use is contemplated to be a shrink film. The high flow PB may improve stretching, processability and optics of the polypropylene random copolymer and appears to result in a film with properties similarly to vinyl.

One or more additives may be added to the poly-1-butene and polypropylene blend. It is contemplated that the additive can be a filler, a mold release agent, U.V. stabilizer, thermal stabilizer, slip agent, antiblock agent, nucleating agent, pigment, antioxidants, flame retardants or combination therein. The additive(s) can be added in an amount up to between about 0.1 to about 1% by weight, based on the total weight of the composition. The additive may be added to one or more of the principal components prior to blending those components. Alternatively, the additive may be added to the blend during the actual blending of the principal components. Additionally, additive may be added to the formulation after blending of the principal components has occurred.

The components in the novel blend can be combined in amounts of no more than about 10% by weight of the poly-1-butene polymer, with at least about 90% by weight of propylene polymer. Optionally, from 0.1 to 1% by weight of an additive or combination of additives, such as those listed above can be added to the blend. A preferred blend is prepared with 5% by weight of a high melt index butene-1 homopolymer (MI greater than 100 to 225) with 95% by weight of a propylene homopolymer.

Blending of the components of the inventive formulation can occur by one of several methods, tumble blending, masterbatch, or melt compounding techniques. The method of combining the ingredients of the formulation is not material except as to the ultimate commercialization of the product. For example, in some cases, it is desirable to use the least amount of energy to merge the components into an effective blend.

After blending, the compositions of this invention can be formed into sheets or articles on conventional manufacturing equipment. Sheets can be formed using conventional casting equipment, that is, the novel formulation can be cast, then passed through a die and then placed into a solid phase pressure forming device which produces the sheets. Films can be prepared from the novel sheets by stretching or orienting the novel sheets, or alternatively, by using tubular film blown processing equipment. These processing techniques are well known in the art. Articles can be formed from the blend or the sheets using conventional molding equipment, such as by thermoforming or SPPF (solid phase pressure forming).

The resulting compositions can have a variety of shapes with varying cross-sectional thickness. For example, the gauge of a sheet can be between about 20–300 mils. Typical parts or articles can be formed from the composition such as liquid containers, spouts for inflatable bags, car parts and other types of articles.

Preferred methods for converting compositions of this invention into blow molded articles, such as bottles, are disclosed in U.S. Pat. No. 4,354,004. The compositions can be processed on equipment designed for the manufacture of polypropylene articles, substantially in the same manner as other commercially molded polymer articles.

It is contemplated that the novel compositions may be processed into fibers using conventional techniques, such as the spin draw techniques or the melt spinning technique. Monofilament or multifilament fibers may be produced. If multifilament fibers are prepared, it is contemplated that 16 to 64 hole spinnerettes and Godet rollers to stretch the drawn filaments can be used.

EXAMPLES

Example 1

Formulation I was prepared from: 95 weight percent PPC508, available from Shell Chemical Co. of Houston, Texas (a polypropylene homopolymer having a melt index of 2.8) and 5 weight percent DP0800 a butene-1 homopolymer also known as WBS608 having a melt index of 200 currently a developmental polymer of Shell Chemical Co. of Houston, Texas.

The typical physical properties of the ultra high melt flow PB are listed below. This grade is a poly(1-butene) homopolymer with 200 melt index (@190° C.) or 450 melt flow (@210° C.).

TABLE I

| | Typical Physical Properties | | | |
|---|---|---|---|---|
| | ASTM | Unit | | |
| | Test Method | English | (Metric) | DP0800 |
| Melt Index | | | | |
| @ 190° C. | D1238 "E" | — | g/10 min | 200 |
| @ 210° C. | D1238 "L" | — | g/10 min | 450 |
| Density | D1505 | lb/ft | g/cm$^3$ | 57.1(0.915) |
| Tensile strength @ yield | D638 | psi | MPa | 2000(13.8) |
| Tensile strength @ break | D638 | psi | MPa | 4200(29.0) |
| Elongation at break | D638 | % | % | 350 |
| Modulus of elasticity | D638 | psi | MPa | 35000(241) |
| Hardness, Shore | D2240 | D scale | D scale | 55(55) |
| Brittleness temperature | D746 | °F. | °C. | 0°(18°) |
| Melting point range | DSC | °F. | °C. | 255-259° (124-126°) |
| Soft point, Vicat | D1525 | °F. | °C. | 241°(116°) |
| Thermal conductivity, at 77° F. | C177 | Btu/ft$^2$/ hr/°F./in | Kcal/m$^2$ hr/°C./cm | 1.25 (16) |

Formulation I was prepared by dry tumbling PPC508 with PB0800 for about 1 hour in a drum at room temperature. The dry tumbled blend was placed in a 1¼" single stage single screw Brabender extruder, with the screw having a mixing head disposed thereon. The compounding was run at a temperature between 420° F. and 450° F. and the mixture was given a residence time of about 5 minutes in the extruder. The mixture was extruded into a strand, cooled and chopped into pellets using conventional techniques. Sheets were then prepared by the casting process using a sheet processing line which consisted of a Killion extruder. Sheets were prepared having 20 mils in thickness.

The sheets were tested on a biaxial stretcher (in some cases on an Iwamoto Film Stretcher) available at the University of Akron, and in other cases on a T.M. Long Stretcher available at the University of Tennessee. Sheet samples were drawn using a 4.4 stretch ratio. The stretching conditions on the sheet were, Draw Temperature - 150° C., Draw Speed - 30 mm/sec or 54 mm/sec, Preheat time - 3 minutes, and grip force -125-150 psi. Table II, which follows, provides the results of the stretching for Formulation I on the T.M. Long Stretcher as Samples 9-16, 29-32, 42, 50, 51, 53, 59, 62, and 65. Tables III and IV provide additional data on tests performed on Formulation I using the Iwamoto film stretcher and the T.M. Long Stretcher, respectively.

Example 2

Formulation II was prepared from 90 weight percent PPC508 and 5 weight percent PB0800. Formulation II was prepared in a manner identical to Formulation I. Sheets of Formulation II were prepared in a manner identical to the Sheets of Formulation I. Testing was carried out on samples of Formulation II in a manner identical to the tests on Formulation I. In particular, on Table II which follows, Formulation II is represented in stretched samples 17-24, 33-36, 38, 39, 41, 43-47, 54, 58, 60, and 64 using the T.M. Long Stretcher. Tables III and IV also provide additional data on tests performed on Formulation II using the Iwamoto and the T.M. Long Stretcher, respectively.

Table II contains information relative to certain control runs using 100% polypropylene. Samples 1-8, 25-28, 37, 40, 48-49, 52, 55-57, 61, 63, and 66-67 are control runs. Control runs are also presented on Tables III and IV.

Table II shows that improvement in particular stretch properties, and in some cases optical properties, have been found with the novel formulations as compared with the control of 100% polypropylene. Tables III and IV show that the water vapor transmission rate (WVTR) data shows no significant change using the polybutylene modified polypropylene films. The tensile properties show that there is no significant reduction of the tensile properties for the 5 weight percent PB modified film. In regard to the processability of the PB modified PP, the modified film required less stretching force and was biaxially oriented more easily.

TABLE I

Polypropylene/Polybutylene Blends and Polypropylene on a T.M. Long Biaxial Film Stretcher

| Sample No. | Composition (w %) | Draw Temp. °C. | Draw Speed (mm/sec) | Preheat Time (min) | Remark |
|---|---|---|---|---|---|
| 1 to 8 | 100 PP | 150 | 30 | 3 | Good stretching |
| 9 to 16 | 95 PP/5 PB | 150 | 30 | 3 | Good stretching |
| 17 to 24 | 90 PP/10 PB | 150 | 30 | 3 | Good stretching |
| 25 to 28 | 100 PP | 150 | 30 | 3 | Good stretching |
| 29 to 32 | 95 PP/5 PB | 150 | 30 | 3 | Good stretching |
| 33 to 36 | 90 PP/10 PB | 150 | 30 | 3 | Good stretching |
| 37 | 100 PP | 120 | 30 | 3 | Would not stretch |
| 38 | 90 PP/10 PB | 120 | 30 | 3 | Would not stretch |
| 39 | 90 PP/10 PB | 125 | 30 | 3 | Slightly stretch |
| 40 | 100 PP | 125 | 30 | 3 | Would not stretch |
| 41 | 90 PP/10 PB | 130 | 30 | 3 | Slightly stretch |
| 42 | 95 PP/5 PB | 130 | 30 | 3 | Slightly stretch |
| 43 | 90 PP/10 PB | 135 | 30 | 3 | Stretch half way |

TABLE I-continued

Polypropylene/Polybutylene Blends and Polypropylene on a T.M. Long Biaxial Film Stretcher

| Sample No. | Composition (w %) | Draw Temp. °C. | Draw Speed (mm/sec) | Preheat Time (min) | Remark |
|---|---|---|---|---|---|
| 44 | 90 PP/10 PB | 135 | 30 | 3 | Stretch half way |
| 45 | 90 PP/10 PB | 140 | 30 | 3 | Stretch 3/4 fully |
| 46 | 90 PP/10 PB | 145 | 30 | 3 | Good stretch |
| 47 | 90 PP/10 PB | 145 | 30 | 3 | Good stretch |
| 48 | 100 PP | 145 | 30 | 3 | Good stretch |
| 49 | 100 PP | 145 | 30 | 3 | Good stretch |
| 50 | 95 PP/5 PB | 145 | 30 | 3 | Good stretch |
| 51 | 95 PP/5 PB | 145 | 30 | 3 | Good stretch |
| 52 | 100 PP | 145 | 54 | 3 | Good stretch |
| 53 | 95 PP/5 PB | 145 | 54 | 3 | Good stretch |
| 54 | 90 PP/10 PB | 145 | 54 | 2 | Good stretch |
| 55 | 100 PP | 145 | 54 | 2 | Good stretch |
| 56 | 100 PP | 145 | 54 | 1 | Good stretch |
| 57 | 100 PP | 145 | 54 | 0.5 | OK but orange peel |
| 58 | 90 PP/10 PB | 145 | 54 | 0.5 | Good stretch |
| 59 | 95 PP/5 PB | 145 | 54 | 0.5 | Slight orange peel |
| 60 | 90 PP/10 PB | 140 | 54 | 3 | Good stretch |
| 61 | 100 PP | 140 | 54 | 3 | Slightly stretch |
| 62 | 95 PP/5 PB | 140 | 54 | 3 | Slightly stretch |
| 63 | 100 PP | 140 | 54 | 3 | Slightly stretch |
| 64 | 90 PP/10 PB | 140 | 54 | 3 | Good stretch |
| 65 | 95 PP/5 PB | 142.5 | 54 | 3 | Good stretch |
| 66 | 100 PP | 142.5 | 54 | 3 | Stretch half way |
| 67 | 100 PP | 145 | 54 | 3 | Good stretch |
| 68 | 100 PP | 145 | 54 | 0.5 | OK but orange peel |
| 69 | 100 PP | 145 | 54 | 0.5 | OK but orange peel |
| 70 | 95 PP/5 PB | 145 | 54 | 0.5 | Slight orange peel |
| 71 | 95 PP/5 PB | 145 | 54 | 0.5 | Slight orange peel |
| 72 | 95 PP/5 PB | 145 | 54 | 0.5 | Slight orange peel |
| 73 | 90 PP/10 PB | 145 | 54 | 0.5 | Good stretch |
| 74 | 90 PP/10 PB | 145 | 54 | 0.5 | Good stretch |
| 75 | 90 PP/10 PB | 145 | 54 | 0.5 | Good stretch |
| 76 | 90 PP/10 PB | 145 | 54 | 0.5 | Good stretch |
| 77 | 100 PP | 160 | 54 | 3 | OK but film hazy |
| 79 | 100 PP | 160 | 54 | 3 | OK but film hazy |
| 80 | 90 PP/10 PB | 160 | 54 | 3 | Uneven stretch |
| 81 | 90 PP/10 PB | 160 | 54 | 3 | Uneven stretch |
| 82 | 100 PP | 160 | 54 | 0.5 | Uneven but clear |
| 83 | 100 PP | 160 | 54 | 0.5 | Uneven but clear |
| 84 | 90 PP/10 PB | 160 | 54 | 0.5 | Uneven but clear |
| 85 | 95 PP/5 PB | 160 | 54 | 0.5 | Uneven but clear |

**PP is Shell PP5C08 (2.8 MF homopolymer) and PB is DURAFLEX ® Polybutylene WBS608 or Dp0800 (200 MF).
These films were stretched using a T.M. Long Stretcher.

Table III shows another set of data on the same biaxially oriented film. Improvement in the optical properties of the high flow PB on PP film is evident. The stretching temperature of the PB modified PP films were lower than that of the control. A tubular film line was also used to assess the stretching ability in terms of bubble stability. Improvement for the high melt flow PB was observed.

TABLE III

Film Properties of PB Modified OPP Films

| Property | 100 w % PP5C08 Control | 95 w % PP5C08 + 5 wt % PBDY0800 Formulation I | 90 w % PP5C08 + 10 w % PBDP0800 Formulation II |
|---|---|---|---|
| Optics | | | |
| Haze, % | 0.55 | 0.40 | 0.55 |
| Gloss (@60°) | 100 | 117 | 100 |
| Clarity, % | 69 | 75 | 76 |
| Specimen Thickness (mil) | 0.45 | 0.62 | 0.45 |
| WVTR, @100° F. & 90% RH g/100 in²/day | 0.902 (@0.35 mil) | 0.605 (@0.55 mil) | 0.620 (@0.40 mil) |
| g. mil/100 in²/day | 0.315 | 0.328 | 0.248 |
| Mechanical | | | |
| Tensile, psi | 24,540 | 24,841 | 20,545 |
| Elongation, % | 34 | 42 | 70 |
| Modulus, psi (1% Secant) | 453,458 | 435,855 | 260,183 |

TABLE III-continued

Film Properties of PB Modified OPP Films

| Property | 100 w % PP5C08<br>Control | 95 w % PP5C08 +<br>5 wt % PBDY0800<br>Formulation I | 90 w % PP5C08 +<br>10 w % PBDP0800<br>Formulation II |
|---|---|---|---|
| Stretching Force, Kg | 10–18 | 8–15 | 8–12 |

Haze was determined by a haze meter ASTM D1003.
Gloss was determined by ASTM D2457.
Clarity was determined by ASTM D1003.
WVTR was determined by ASTM E96.
Tensile was determined by ASTM D882.
Elongation was determined by ASTM D882.
Modulus was determined by ASTM D882.
Stretching Force was determined by the dial reading of the Iwamoto Stretcher.
These formulations were stretched using an Iwamoto stretcher.

TABLE IV

Film Properties of PB Modified OPP Films

| Property | PP5C08<br>Control | PP5C08 +<br>5 wt % PB0800<br>Formulation I | PP5C08 +<br>10 wt % PB0800<br>Formulation II |
|---|---|---|---|
| Optics | | | |
| Haze, % | 2.59 | 1.40 | 1.10 |
| Gloss (@60°) | 75.9 | 85.9 | 85.4 |
| Clarity, % | 5.3 | 24.5 | 17.0 |
| Specimen Thickness (mil) | 0.80 | 0.74 | 0.82 |
| WVTR, @100° F. & 90% RH g/100 in²/day | 0.425 (@0.65 mil) | 0.475 (@0.65 mil) | 0.535 (@0.65 mil) |
| g. mil/100 in²/day | 0.276 | 0.309 | 0.348 |
| Mechanical | | | |
| Tensile, psi | 23,695 | 20,253 | 18,599 |
| Elongation, % | 84 | 82 | 88 |
| Modulus, psi (1% Secant) | 351,911 | 388,472 | 309,716 |
| Stretching Temperature Window, | 293–320° F. | 289–319 | 284–315 |

Haze was determined by a haze meter ASTM D1003.
Gloss was determined by ASTM D2457.
Clarity was determined by ASTM D1003.
WVTR was determined by ASTM E96.
Tensile was determined by ASTM D882.
Elongation was determined by ASTM D882.
Modulus was determined by ASTM D882.
Stretching Force was determined by the dial reading of the T.M. Long Stretcher.
These samples were stretched on the TM long strecher.

Example 3

A Formulation III was prepared from 95 wt % PPC508 with 5 wt % of PB0400 a butene-1 homopolymer having a melt index of 20 and a molecular weight of 202,000. Formulation III was prepared by dry tumbling PP508 with PB400 for about 1 hour in a drum at room temperature. The dry tumbled blend was placed in a 1¼" single stage single screw Brabender extruder, with the screw having a mixing head disposed thereon. The compounding was run at a temperature between 420° F. and 450° F. and the mixture was given a residence time of about 5 minutes in the extruder. The mixture was extruded into a strand, cooled and chopped into pellets using conventional techniques. Sheets were then prepared by the casting process using a sheet processing line which consisted of a Killion extruder. Shots were prepared having a thickness of 7 mils.

The sheets were then tested on a T.M. Long biaxial stretcher. Sheets were drawn using a 3.0 stretch ratio. The stretching conditions on the sheet were Draw Temp 143° C., Draw speed 30 mm/sec, Preheat time - 45 seconds. Table V, which follows, provides the test results for Formulation III and additionally, test results for a control formulation using only PP5C08 under the identical conditions.

TABLE V

Film Properties of PB Modified Film

| Property | PP5C08<br>Control | PP5C08 +<br>5 wt % PB0400<br>Formulation III |
|---|---|---|
| Specimen Thickness (Mil) | 0.78 | 0.78 |
| Optics | | |
| Haze, % | 10.9 | 14.8 |
| Clarity, % | 11.9 | 3.4 |
| Gloss (@60°) | 56.2 | 78.8 |
| Draw Temp. (°C.) | 148 | 143 |

Note:
(1) PB0400: Melt index = 20 measured by ASTM D1238 Condition "E" at 190° C. Molecular weight = 202,000, tested with decalin as solvent.
(2) The higher number of haze = worse haze The lower number of clarity = worse clarity The lower number of gloss = worse gloss Although the test conditions differ, and the thickness of the samples differ between Table V showing the PB0400 blend and Tables III and IV with the PBDP0800 blend, it can be surmised that the PB0400 with the lower melt index does not perform as well as the PBDP0800 with regard to gloss, haze, and clarity.

The high melt flow butene-1 polymer flows better than the low melt flow material creating a film or article with good optical properties. The high melt flow material flows better to the surface of the film creating a higher value of gloss than a low melt flow PB. In the bulk of the film during stretching, the high melt flow material fills the microvoids better than low melt flow PB with improved gloss and reduction of microvoids in the bulk. The clarity and haze of the high melt flow material (over 100 MI) is improved with PBDP0800 when compared with low melt flow PB material (20 MI).

In terms of processability, the high melt flow material acts as a better lubricant than a low melt flow PB and consequently improves the processability of the material into film, additionally and unexpectedly reducing film breakage when compared with low melt flow PB material.

The examples above are intended only for the purposes of being illustrative of the invention. It is not intended that that invention be limited in scope to the Examples.

It is also contemplated that the present invention includes laminar structures, wherein the novel blend is disposed on a substrate, such as nylon or polyester or polycarbonate with or without an additional tie layer adhesive forming a laminate or laminar structure.

What is claimed is:

1. A composition comprising a blend of a low molecular weight, isotactic poly-1-butene polymer with a melt index in the range of greater than 100 to about 1000, said poly-1- butene polymer amounting to less than 10% by weight, but being present in an amount sufficient to improve the gloss and clarity of the propylene polymer, and at least
of a propylene polymer. 90% by weight of a propylene polymer and an intrinsic viscosity of less than about 0.11.

2. The composition of claim 1, further comprising about 0.1 to about 1% by weight of an additive.

3. The composition of claim 2, wherein said additive is selected from the group comprising: mold release agents, U.V. stabilizers, thermal stabilizers, fillers, slip agents, antiblock agents, nucleating agents, pigments, antioxidants, flame retardants and mixtures thereof.

4. The composition of claim 1, wherein said poly-1-butene polymer has a melt index in the range of about 150 to about 225.

5. The composition of claim 1, wherein said poly-1-butene polymer is selected from the group comprising: butene-1 homopolymers, and butene-1 copolymers having 1-30 mole % of an alpha olefin having from 2-8 carbon atoms.

6. The composition of claim 1, wherein said propylene polymer is a member of the group comprising: propylene homopolymers, and propylene copolymers having 1-30 mole % of an alpha olefin having from 2-8 carbon atoms.

7. The composition of claim 1 comprising 95% by weight of said propylene polymer and 5% by weight of said poly-1-butene polymer.

8. A molded article prepared from a composition comprising: low molecular weight, isotactic poly-1-butene polymer with a melt index in the range of greater than 100 to about 1000 , said poly-1-butene polymer amounting to less than 10% by weight, but being present in an amount sufficient to improve the gloss and clarity of the propylene polymer, and at least 90% by weight of a propylene polymer and an intrinsic viscosity of less than about 0.11.

9. The molded article of claim 8, further comprising about 0.1 to about 1% by weight of an additive.

10. The molded article of claim 9, wherein said additive is selected from the group comprising: mold release agents, U.V. stabilizers, thermal stabilizers, fillers, slip agents, antiblock agents, nucleating agents, pigments, antioxidants, flame retardants and mixtures thereof.

11. The molded article of claim 8, wherein said poly-1-butene polymer has a melt index in the range of about 150 to about 225.

12. The molded article of claim 8 wherein said poly-1-butene polymer is selected from the group comprising: butene-1 homopolymers, and butene-1 copolymers having 1-30 mole % of an alpha olefin having from 2-8 carbon atoms.

13. The molded article of claim 8, wherein said propylene polymer is a member of the group comprising: propylene homopolymers, and propylene copolymers having 1-30 mole % of an alpha olefin having from 2-8 carbon atoms.

14. The molded article of claim 8 comprising 95% by weight of said propylene polymer and 5% by weight of said poly-1-butene polymer.

15. A blow molded article prepared from a blend comprising a low molecular weight, isotactic poly-1butene polymer with a melt index in the range of greater than 100 to about 1000, said poly-1-butene polymer amounting to less than 10% by weight, but being present in an amount sufficient to improve the gloss and clarity of the propylene polymer, and at least 90% by weight of a propylene polymer and an intrinsic viscosity of less than about 0.11.

16. The blow molded article of claim 15, wherein said blend further comprises about 0.1 to about 1% by weight of an additive.

17. The blow molded article of claim 16, wherein said additive is selected from the group comprising: mold release agents, U.V. stabilizers, thermal stabilizers, fillers, slip agents, antiblock agents, nucleating agents, pigments, antioxidants, flame retardants and mixtures thereof.

18. The blow molded article of claim 15, wherein said poly-1-butene polymer of said blend has a melt index in the range of about 150 to about 225.

19. The blow molded article of claim 15, wherein said poly-1-butene polymer of said blend is selected from the group comprising: butene-1 homopolymers, and butene-1 copolymers having 1-30 mole % of an alpha olefin having from 2-8 carbon atoms.

20. The blow molded article of claim 15, wherein said propylene polymer of said blend is a member of the group comprising: propylene homopolymers, and propylene copolymers having 1-30 mole % of an alpha olefin having from 2-8 carbon atoms.

21. The blow molded article of claim 15, wherein said blend comprises 95% by weight of said propylene polymer and 5% by weight of said poly-1-butene polymer.

22. A fiber prepared from a blend comprising no more than 10% by weight of a low molecular weight, isotactic poly-1-butene polymer with a melt index in the range of greater than 100 to about 1000 and an intrinsic viscosity of less than about 0.11, and at least 90% by weight of a propylene polymer.

23. The fiber of claim 22, wherein said blend further comprises about 0.1 to about 1% by weight of an additive.

24. The fiber of claim 23, wherein said additive is selected from the group comprising: mold release agents, U.V. stabilizers, thermal stabilizers, fillers, slip agents, antiblock agents, nucleating agents, pigments, antioxidants, flame retardants and mixtures thereof.

25. The fiber of claim 22, wherein said poly-1-butene polymer of said blend has a melt index in the range of about 150 to about 225.

26. The fiber of claim 22, wherein said poly-1-butene polymer of said blend is selected from the group comprising: butene-1 homopolymers, and butene-1 copolymers having 1-30 mole % of an alpha olefin having from 2-8 carbon atoms.

27. The fiber of claim 22, wherein said propylene polymer of said blend is a member of the group comprising: propylene homopolymers, and propylene copolymers having 1-30 mole % of an alpha olefin having from 2-8 carbon atoms.

28. The fiber of claim 22, wherein said blend comprises 95% by weight of said propylene polymer and 5% by weight of said poly-1-butene polymer.

29. A film or sheet prepared from a blend comprising a low molecular weight, isotactic poly-1-butene polymer with a melt index in the range of greater than 100 to about 1000, and an intrinsic viscosity of less than about 0.11, and at least 90% by weight of a propylene polymer, said poly-1- butene polymer amounting to less than 10% by weight, but being present in an amount sufficient to improve the gloss and clarity of the propylene polymer.

30. The film or sheet of claim 29, wherein said blend further comprises about 0.1 to about 1% by weight of an additive.

31. The film or sheet of claim 30, wherein said additive is selected from the group comprising.. mold release agents, U.V. stabilizers, thermal stabilizers, fillers, slip agents, antiblock agents, nucleating agents, pigments, antioxidants, flame retardants and mixtures thereof.

32. The film or sheet of claim 29, wherein said poly-1-butene polymer of said blend has a melt index in the range of about 150 to about 225.

33. The film or sheet of claim 29, wherein said poly-1-butene polymer of said blend is selected from the group comprising: butene-1 homopolymers, and butene-1 copolymers having 1-30 mole % of an alpha olefin having from 2-8 carbon atoms.

34. The film or sheet of claim 29, wherein said propylene polymer of said blend is a member of the group comprising: propylene homopolymers, and propylene copolymers having 1-30 mole % of an alpha olefin having from 2-8 carbon atoms.

35. The film or sheet of claim 29, wherein said blend comprises 95% by weight of said propylene polymer and 5% by weight of said poly-1-butene polymer.

* * * * *